(12) United States Patent
Lavoie (10) Patent No.: US 9,690,463 B2
(45) Date of Patent: Jun. 27, 2017

(54) SELECTING ACTIONABLE ITEMS IN A GRAPHICAL USER INTERFACE OF A MOBILE COMPUTER SYSTEM

(71) Applicant: Oracle International Corporation, Redwood Shores, CA (US)

(72) Inventor: Martin-Gilles Lavoie, Bois-Des-Filion (CA)

(73) Assignee: Oracle International Corporation, Redwood Shores, CA (US)

( * ) Notice: Subject to any disclaimer, the term of this patent is extended or adjusted under 35 U.S.C. 154(b) by 306 days.

(21) Appl. No.: 14/617,772

(22) Filed: Feb. 9, 2015

(65) Prior Publication Data

US 2016/0196041 A1 Jul. 7, 2016

Related U.S. Application Data

(60) Provisional application No. 62/100,330, filed on Jan. 6, 2015.

(51) Int. Cl.
*G06F 3/0481* (2013.01)
*G06F 3/0484* (2013.01)
(Continued)

(52) U.S. Cl.
CPC ........ *G06F 3/04842* (2013.01); *G06F 3/0482* (2013.01); *G06F 3/04817* (2013.01); *G06F 3/04883* (2013.01); *G06F 3/04886* (2013.01)

(58) Field of Classification Search
CPC .... G06F 3/0484; G06F 3/0488; G06F 3/0481; G06F 3/0482
See application file for complete search history.

(56) References Cited

U.S. PATENT DOCUMENTS 8,464,180 B1* 6/2013 Kirkham ........... H04M 1/72586
715/765
8,769,431 B1 7/2014 Prasad
(Continued)

FOREIGN PATENT DOCUMENTS

EP 2144150 A2 1/2010

OTHER PUBLICATIONS

Karlson et al.; "ThumbSpace: Generalized One-Handed Input for Touchscreen-Based Mobile Devices"; Human-Computer Interaction Lab, Department of Computer Science, University of Maryland, College Park, MD 20742; Mar. 2007.
(Continued)

*Primary Examiner* — David Choi
(74) *Attorney, Agent, or Firm* — Miles & Stockbridge PC (57) ABSTRACT

A computer-based method for selecting an actionable item displayed in a graphical user interface on a mobile computer system is provided. The method includes detecting a first gesture, ending at a first position, on a lower portion of a touchscreen; in response to detecting the first gesture, activating a single-handed operation mode; determining a sequence of actionable items for a foreground application executing on a processor; detecting a second gesture on the touchscreen, the second gesture beginning at the first position and ending at a second position; in response to detecting the second gesture, highlighting one of the actionable items of the sequence based on the second position; detecting a third gesture on the touchscreen; and, in response to detecting a release at the second position as the third gesture, selecting the highlighted actionable item for processing by the foreground application and de-activating the single-handed operation mode.

20 Claims, 10 Drawing Sheets

(51) Int. Cl.
*G06F 3/0488* (2013.01)
*G06F 3/0482* (2013.01)

(56) References Cited

U.S. PATENT DOCUMENTS

| | | | |
|---|---|---|---|
| 8,819,569 B2 | 8/2014 | SanGiovanni et al. | |
| 8,976,202 B2* | 3/2015 | Caissy | G06F 3/0338 345/659 |
| 2004/0135823 A1 | 7/2004 | Wingett et al. | |
| 2005/0193350 A1* | 9/2005 | Ishiguro | G06F 3/04892 715/794 |
| 2008/0256454 A1 | 10/2008 | Latzina et al. | |
| 2011/0307310 A1* | 12/2011 | Kamat | G06F 9/4443 705/14.4 |
| 2012/0216143 A1* | 8/2012 | Shiplacoff | G06F 3/0416 715/784 |
| 2014/0082546 A1* | 3/2014 | Yang | G06F 3/04886 715/773 |
| 2014/0089829 A1 | 3/2014 | Han et al. | |
| 2014/0204054 A1* | 7/2014 | Kim | G06F 3/0412 345/174 |
| 2016/0155428 A1* | 6/2016 | Zhang | H04M 1/72519 715/799 |
| 2016/0196041 A1* | 7/2016 | Lavoie | G06F 3/04842 715/822 |

OTHER PUBLICATIONS

"Design iPhone at its largest. And thinnest"; http://www.apple.com/iphone-6/design/; last downloaded on Dec. 2, 2014.

"Panasonic Eluga U Review"; http://www.fonearena.com/blog/111935/panasonic-eluga-u-review.html; last downloaded Dec. 2, 2014.

"The Galaxy Note 3 Has a Hidden Tiny Screen Mode"; http://gizmodo.com/the-galaxy-note-3-has-a-hidden-tiny-screen-mode-for-you-1440207675; last downloaded on Dec. 2, 2014.

"MIUI 6 Update introduces One-handed Operation Mode for Mi 3 & Mi 4"; http://webtrickz.com/miui-6-update-introduces-one-handed-operation-mode-for-mi-3-mi-4/; last downloaded on Dec. 3, 2014.

Karlson; "Interface Design for Single-Handed Use of Small Devices"; Human-Computer Interaction Lab, Department of Computer Science, University of Maryland, College Park, MD 20742; 2008.

"HTC TouchFlo 3D—A 3D perspective"; http://www.hardwarezone.com.sg/feature-hte-touchflo-3d-3d-perspective/third-times-charm; last downloaded on Dec. 2, 2014.

"HTC Touch Pro User Manual"; http://www.uu.nl/SiteCollectionDocuments/ICT/OFFICIAL_htc-touch_pro_engels.pdf; downloaded on Dec. 2, 2014.

* cited by examiner

SELECTING ACTIONABLE ITEMS IN A GRAPHICAL USER INTERFACE OF A MOBILE COMPUTER SYSTEM

CROSS-REFERENCE TO RELATED APPLICATIONS

This application is a Nonprovisional of U.S. Provisional Patent Application Ser. No. 62/100,330, filed on Jan. 6, 2015, the disclosure of which is incorporated herein by reference in its entirety

TECHNICAL FIELD

One embodiment is directed generally to a mobile computer system, and, in particular, to a graphical user interface of a mobile computer system.

BACKGROUND

Figure 1:
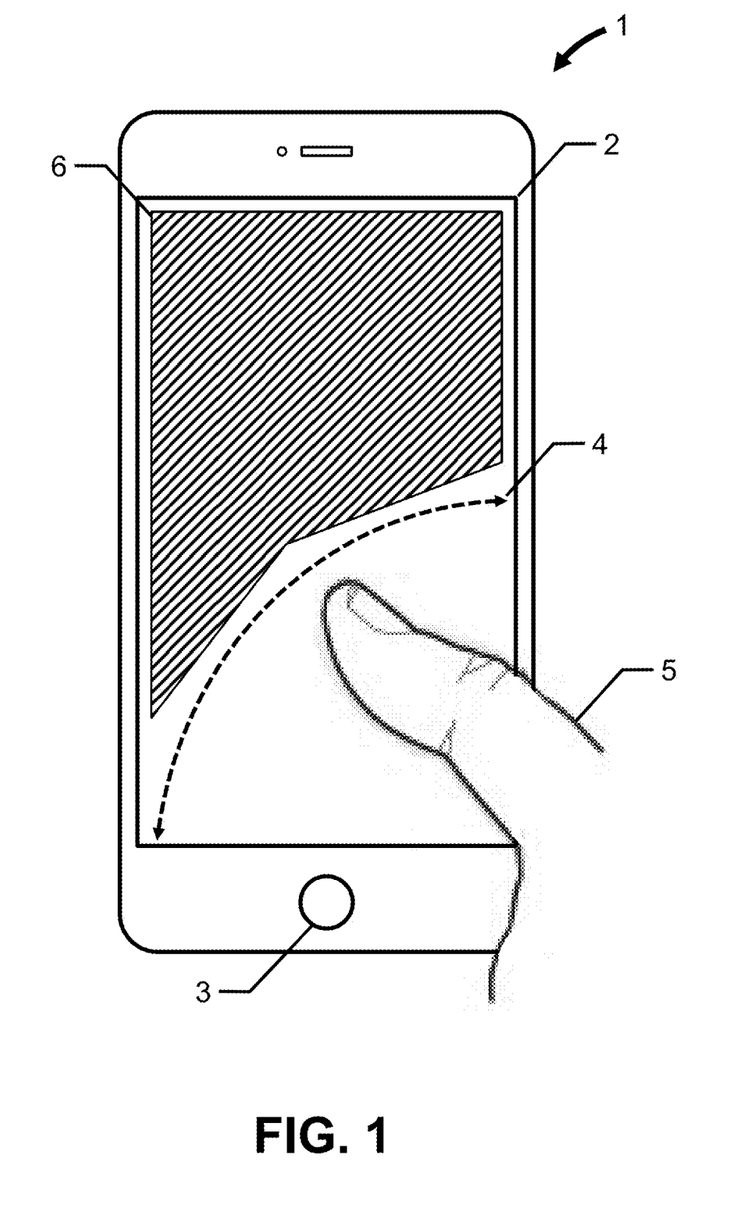
FIG. 1 is a diagram depicting a mobile computer system held in a user's hand.

As the size of mobile computer system touchscreens increases, single-handed operation of these devices becomes increasingly difficult. For example, a large screen smartphone, as shown in FIG. 1, such as, for example, an LG G3 Android, a Samsung Galaxy S5, an HTC One Max Android, an Apple iPhone 6 Plus, etc., may include a touchscreen 2 having a height of about 5 inches and a width of about 3 inches. As depicted in FIG. 1, grasping a large screen smartphone 1 in the right hand (only) allows an average user's thumb 5 a range of motion that provides access to the home button 3, and a pie-shaped region of touchscreen 2 generally prescribed by semicircular arc 4, the bottom of touchscreen 2 and a portion of the right side of touchscreen 2. Users with bigger hands and longer thumbs will be able to access a larger region of touchscreen 2, while users with smaller hands and shorter thumbs will be able to access a smaller region of touchscreen 2. Unfortunately, selectable elements of the graphical user interface for an application executing in the foreground, such as, for example, icons in a home screen, graphical control elements in a browser application, etc., that are displayed within the upper portion 6 of touchscreen 2 are unreachable using the thumb 5 and a one-handed grasp.

Attempts to mitigate the difficulties associated with one-handed operation of large screen smartphones have been made by several smartphone manufacturers. In one attempt, the user can switch smartphone 1 into a small screen mode, which shrinks the graphical user interface to a smaller size for display in a lower portion of touchscreen 2. Shrinking the size of the graphical user interface to allow the user to access all of the elements generally defeats the purpose of having a large touchscreen in the first place, and may render certain elements of the graphical user interface too small to select with thumb 5, too small to read, etc. In another attempt, the user can activate a reachability mode which slides the upper portion of the graphical user interface down to the lower portion of touchscreen 2, while removing the lower portion of the graphical user interface entirely from touchscreen 2. Once reachability mode is activated, only the elements of the graphical user interface that are visible in the lower portion of touchscreen 2 may be selected by the user, which may render certain gestures impossible to perform, etc.

SUMMARY

Embodiments of the present invention provide a computer-based method for selecting an actionable item displayed in a graphical user interface on a mobile computer system with a processor and a touchscreen. The method includes detecting a first gesture, ending at a first position, on a lower portion of the touchscreen; in response to detecting the first gesture, activating a single-handed operation mode; determining a sequence of actionable items for a foreground application executing on the processor; detecting a second gesture on the touchscreen, the second gesture beginning at the first position and ending at a second position; in response to detecting the second gesture, highlighting one of the actionable items of the sequence based on the second position; detecting a third gesture on the touchscreen; and, in response to detecting a release at the second position as the third gesture, selecting the highlighted actionable item for processing by the foreground application and de-activating the single-handed operation mode.

DETAILED DESCRIPTION

Embodiments of the present invention will now be described with reference to the drawing figures, in which like reference numerals refer to like parts throughout.

Embodiments of the present invention advantageously provide a short reach, single-handed operation mode on a mobile computer system. In one embodiment, in response to detecting a first gesture on a touchscreen, a sequence of actionable items for a foreground application executing on the mobile computer system is determined, in response to detecting a second gesture on the touchscreen, one of the actionable items of the sequence is highlighted, and, in response to detecting a third gesture, the highlighted actionable item is selected for processing by the foreground application and the single-handed operation mode is de-activated.

In one embodiment, the first gesture is a horizontal swipe using a thumb, which may start at a side edge of a lower portion of the touchscreen. In another embodiment, the second gesture is a vertical swipe using the thumb. The vertical swipe does not need to remain parallel to the side edges of the touchscreen, and may describe an arc generally similar to arc 4 of FIG. 1. The vertical component of the second gesture will be used to determine which actionable item should be highlighted. In a further embodiment, the third gesture is a thumb lift (release). In certain embodiments, the first and second gestures are performed sequentially, i.e., without lifting the thumb from the touchscreen. Advantageously, all three gestures may be accomplished by the user's thumb without re-adjusting the user's grip on the mobile computer system, requiring less than two inches of thumb movement in many cases. These gestures may be performed significantly faster by the user than other methods of controlling the graphical user interface.

In certain embodiments, the sequence of actionable items is determined by identifying all of the actionable items displayed by the foreground application on the touchscreen, and then sorting or arranging the actionable items, in a sequence, in a predetermined order. In one embodiment, the predetermined order starts at the upper left corner of the graphical user interface and ends at the lower right corner of the graphical user interface. After single-handed operation mode has been activated by the first gesture, the second gesture allows the user to progress through the sequence of actionable items, highlighting each one in turn until a desired actionable item is highlighted. The third gesture selects the actionable item for processing by the foreground application and de-activates single-handed operation mode. Advantageously, the actionable items are displayed in their original locations in the graphical user interface during single-handed operation mode.

In certain embodiments, the foreground application may be the operating system's home screen(s), which displays one or more pages of icons representing applications stored on the mobile computer system. The icons are displayed in a grid, and, in one embodiment, the sequence of actionable items includes a listing of icons starting with the first icon on the left side of the upper row of the grid and proceeding to the last icon on the ride side of the lowest row of the grid. Other icon list sequences are also contemplated. As the user executes the second gesture, such as, for example, a vertical swipe or arc, the icons are highlighted based on the thumb's vertical movement during the second gesture. As the thumb moves upwards during the second gesture, the icons are highlighted in sequence, and as the user's thumb moves downwards during the second gesture, the icons are highlighted in reverse sequence. The highlighting can include changing the color of the icon, adding a border around the icon, etc. When the third gesture is detected, such as a release, the icon highlighted at the current position is selected for processing by the operating system (e.g., launching the highlighted application), and the single-handed operation mode is de-activated.

If the second gesture is continued until the last icon in the sequence is highlighted, additional vertical movement of the thumb causes the last icon to be de-highlighted, and a release at this time de-activates single-handed operation mode without selecting an icon for processing by the operating system. Alternatively, a horizontal swipe may be used in place of the release. This may occur at either end of the sequence, i.e., at the beginning of the list or at the end of the list. For example, a continuation of the second gesture in the upward direction will highlight each icon in the list until the last icon in the list has been de-highlighted. A release or horizontal swipe at this time will deactivate the single-handed operation mode. If the user reverses direction during the continuation of the second gesture, the icons will be highlighted in reverse order, until the first icon in the list has been de-highlighted. A release or horizontal swipe at this time will also de-activate the single-handed operation mode.

The inventive method may be applied to other foreground applications executing on the mobile computer system. In these cases, the actionable items may include selectable elements of the graphical user interface for that application, such as, for example, icons, graphical control elements, widgets, tabs, etc. For example, if a text box is highlighted and then selected by the user, the foreground application may process this selection by presenting a cursor within the text box and a keyboard in the lower portion of the touchscreen to receive user input.

Figure 2:
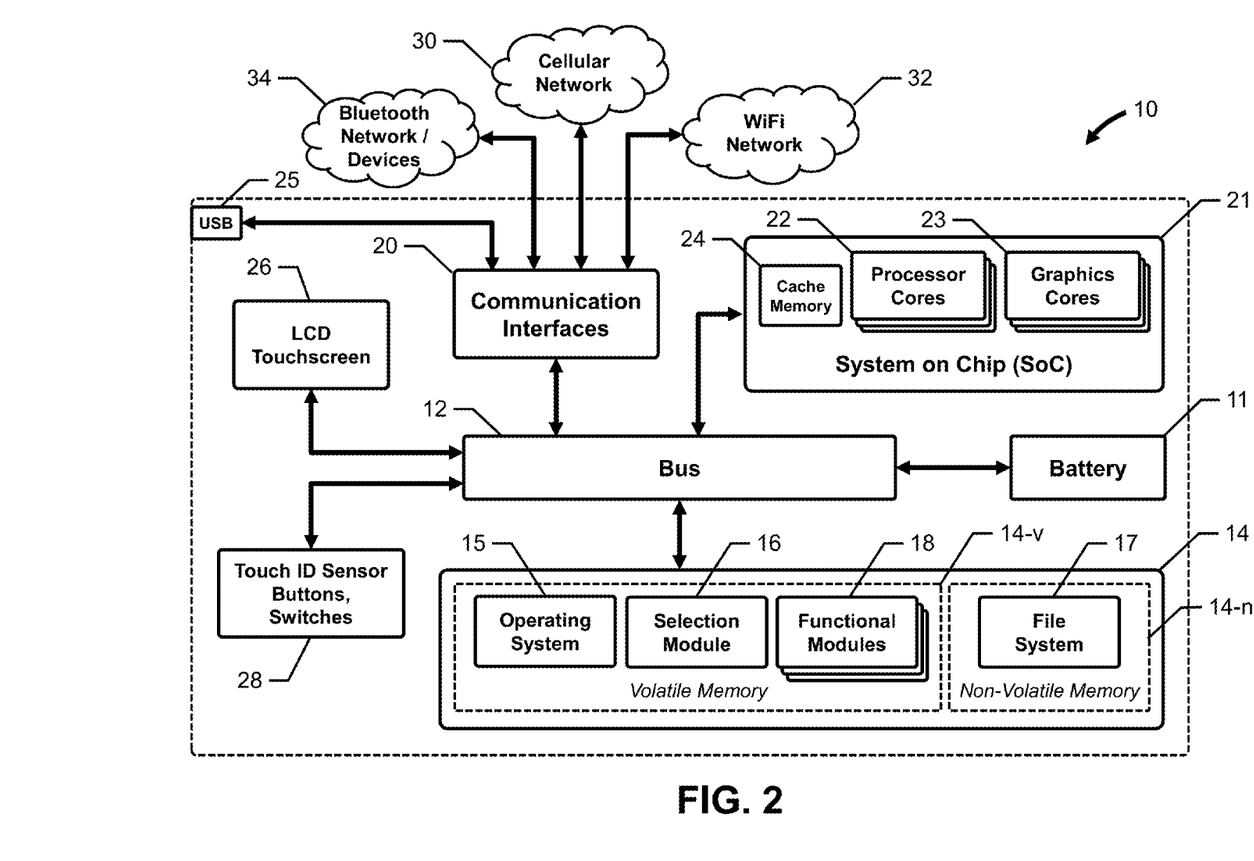
FIG. 2 is a system block diagram of a mobile computer system, in accordance with an embodiment of the present invention.

FIG. 2 is a system block diagram of a mobile computer system 10, in accordance with an embodiment of the present invention.

Mobile computer system 10 includes a rechargeable battery 11, a bus 12 or other communication mechanism for communicating information, and a System-on-Chip ("SoC") 21 coupled to bus 12 for processing information. SoC 21 is an integrated circuit that integrates the major components of mobile computer system 10 onto a single chip. SoC 21 may include a multicore processor 22 having two or more processor cores, which may be any type of general or specific processor core. The number of processor cores may be 2, 4, etc. SoC 21 may also include a multicore graphics processor 23 having two or more graphics cores, which may be any type of general or specific graphics core. The number of graphics cores may be 2, 4, etc. SoC 21 includes shared memory 24, such as L1 caches for each processor and graphics core, L2 and L3 caches that are accessible by multicore processor 22 and multicore graphics processor 23, etc. In alternative embodiments, SoC 21 may be replaced by two or more single-core processors and supporting components, combinations of single-core and multicore processors and supporting circuitry, etc.

Mobile computer system 10 also includes memory 14 for storing information and instructions to be executed by multicore processor 22 and multicore graphics processor 23, as well as a file system 17. Memory 14 may be comprised of any combination of storage devices, such as, for example, volatile memory 14-v including random access memory ("RAM"), etc., and non-volatile memory 14-n including NAND flash memory, read only memory ("ROM"), etc. Computer readable media may be any available media that can be accessed by the components of SoC 21, including volatile memory 14-v and nonvolatile memory 14-n, removable and non-removable media, and communication media. Communication media may include computer readable instructions, data structures, program modules, or other data in a modulated data signal such as a carrier wave or other transport mechanism, and includes any information delivery media.

Mobile computer system 10 also includes communication interfaces 20, coupled to bus 12, to provide access to various wireless networks, such as a cellular network 30, a Wi-Fi network 32, a Bluetooth network 34 and/or individual Bluetooth devices, etc., as well as access to one or more wired networks or devices, such as a Universal Serial Bus ("USB") via USB connector 25. Mobile computer system 10 also includes a Liquid Crystal Display ("LCD") touchscreen 26 and one or more sensors, buttons and/or switches 28, such as, for example, a touchpad, a home button, a touch ID sensor/home button combination, a programmable mute switch, a volume rocker switch, etc., coupled to bus 12, to enable a user to interface with mobile computer system 10.

In one embodiment, memory 14 stores software modules that provide functionality when executed by multicore processor 22 and multicore graphics processor 23. The modules include an operating system 15 that provides operating system functionality for system 10. The modules further include a selection module 16 for selecting an actionable item displayed in a graphical user interface on LCD touchscreen 26, and all other functionality disclosed herein. System 10 can include one or more additional functional modules 18, such as, for example, applications, add-ons, etc. Alternatively, selection module 16 may be included within operating system 15 and/or functional modules 18. File system 17 provides, inter alia, centralized storage for operating system 15, selection module 16 and functional modules 18.

Figure 3:
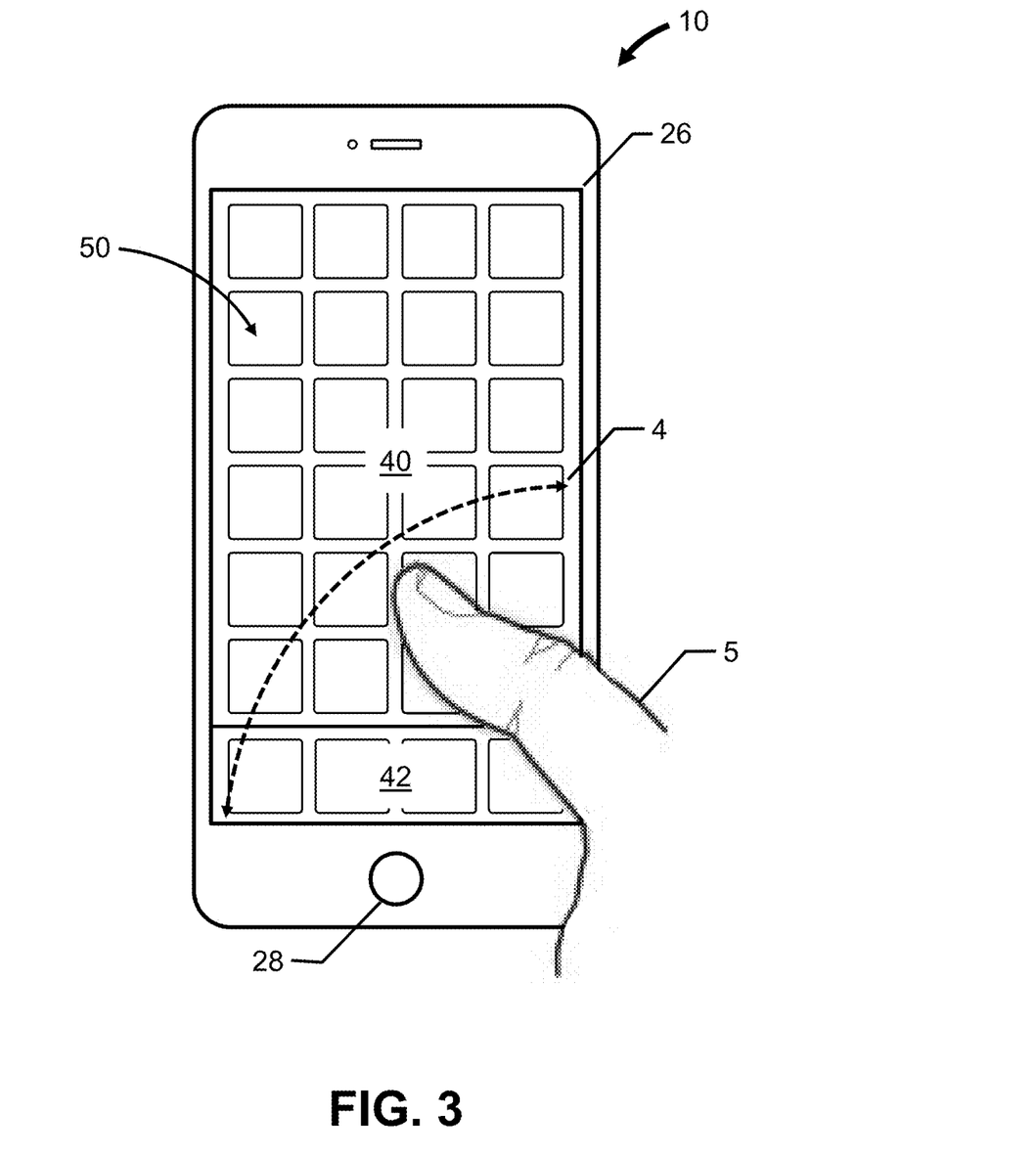
FIG. 3 is a diagram depicting a mobile computer system held in a user's hand, in accordance with an embodiment of the present invention.

FIG. 3 is a diagram depicting a mobile computer system 10 held in a user's hand, such as an Apple iPhone 6 Plus, which will be used to illustrate certain aspects of the present invention. When held in the user's right hand, thumb 5 can access a Touch ID/home button 28 and a pie-shaped region of touchscreen 26 generally prescribed by semicircular arc 4, the bottom of touchscreen 26 and a portion of the right side of touchscreen 26. While mobile computer system 10 is depicted as being held in a portrait orientation, the user may also hold mobile computer system 10 in a landscape orientation. Additionally, embodiments of the present invention are not limited to large screen mobile devices.

The operating system 15, such as Apple's iOS 8, displays one or more home screens 40 to the user, on which application icons and application folder icons 50 are displayed. In this example, up to twenty four (24) icons 50 can be displayed in each home screen 40, in six rows of four icons. A dock 42, located on the lower portion of each home screen, displays the same set of application icons on each home screen 40. In this example, up to four (4) application icons can be displayed in dock 42, in one row of four icons. Dots (not depicted for clarity) above dock 42 show how many home screens 40 are available to the user, and which home screen 40 is currently being viewed. A status bar (not depicted for clarity) at the top of touchscreen 26 displays various icons, including, for example, a cell signal icon, an airplane mode icon, a network icon, a Wi-Fi icon, a battery icon, etc.

In this example, operating system 15 is the foreground application, and each application icon is an actionable item, which, when selected by the user, causes the operating system 15 to launch the particular application.

Figure 4A:
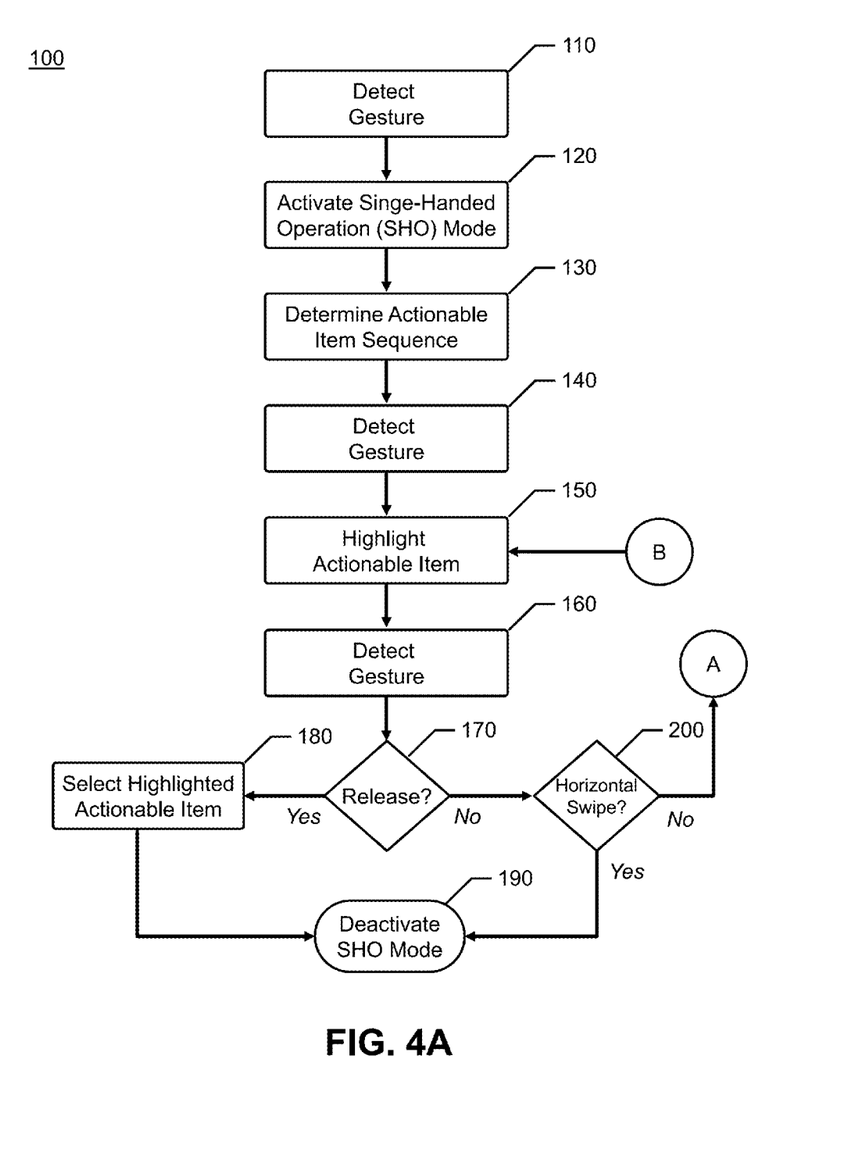
FIGS. 4A and 4B present a flow diagram depicting at least some of the functionality of a selection module of FIG. 2, in accordance with embodiments of the present invention.
Figure 4B:
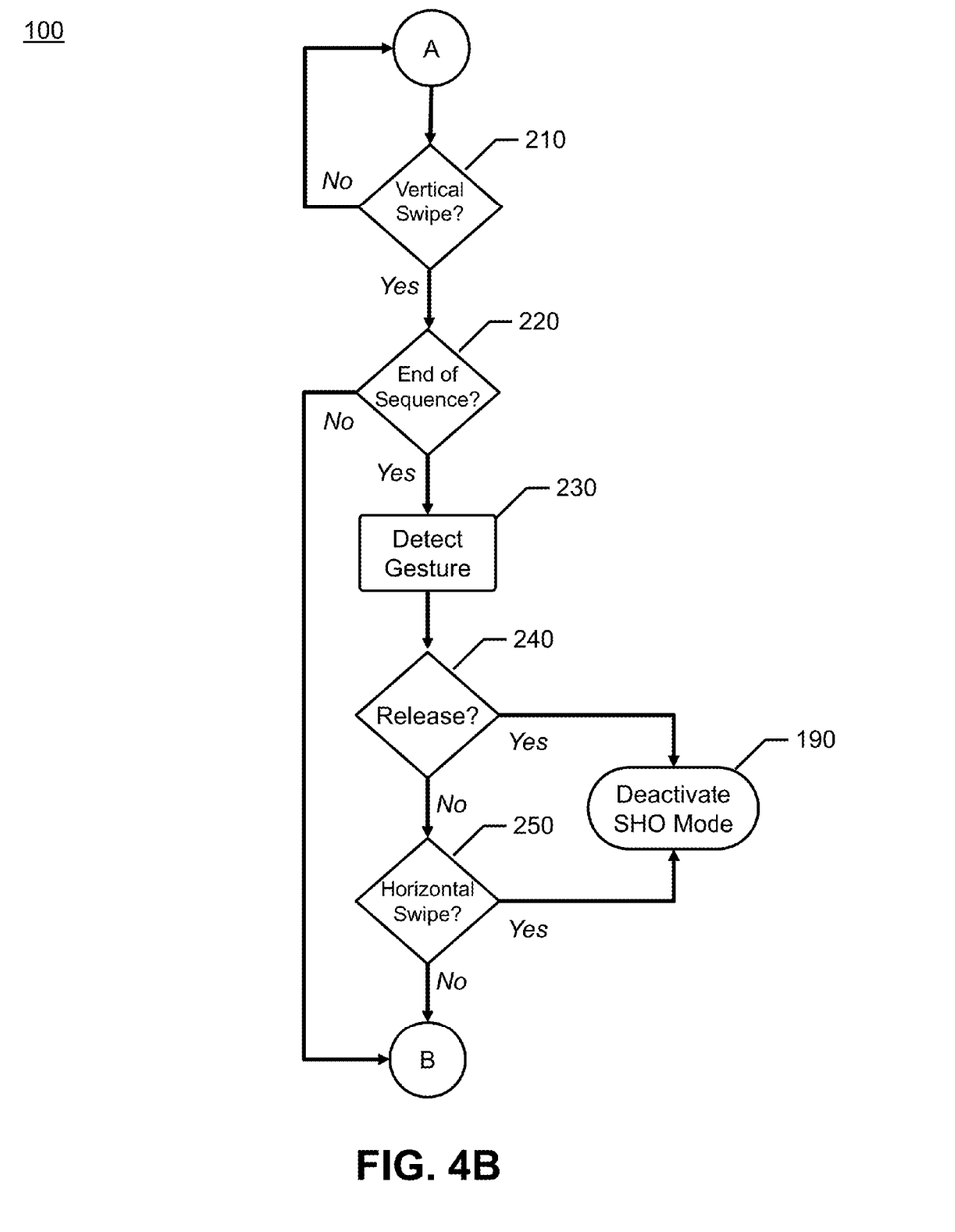

FIGS. 4A and 4B present a flow diagram 100 depicting at least some of the functionality of selection module 16 of FIG. 1, in accordance with embodiments of the present invention. In some embodiments, the functionality of the flow diagram 100 may be implemented by software stored in memory or other computer readable, tangible non-transitory medium, and executed by multicore processor 22, multicore graphics processor 23, etc. In other embodiments, the functionality may be performed by other SoC 21 components, such as, for example, an application specific integrated circuit ("ASIC"), a programmable gate array ("PGA"), a field programmable gate array ("FPGA"), etc., or through any combination of hardware and software.

Figure 5A:
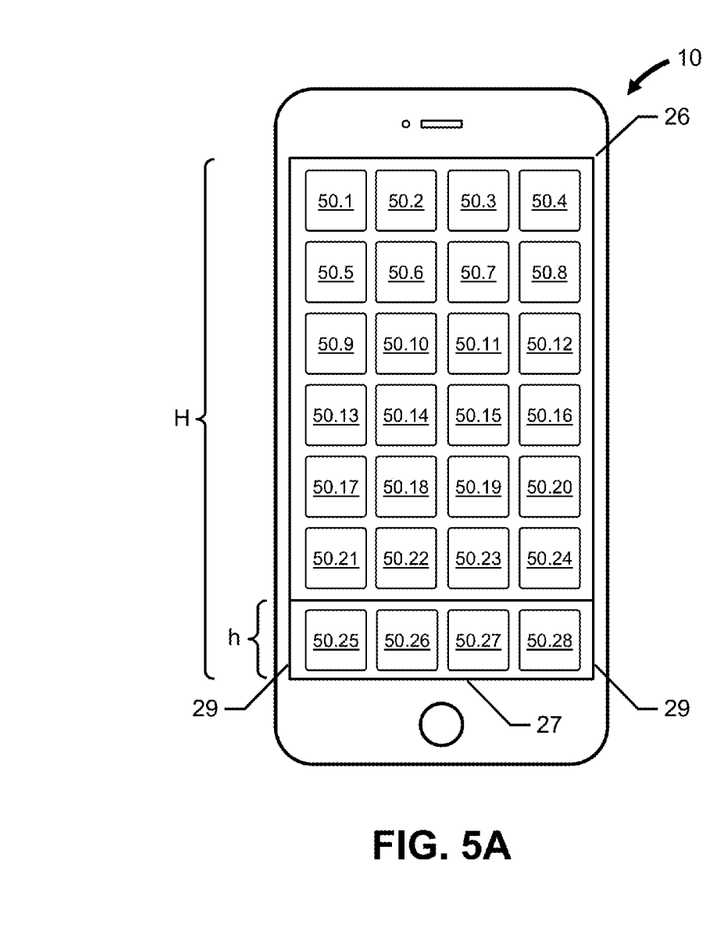
FIGS. 5A to 5J are diagrams of a mobile computer system depicting a single-handed operation mode, in accordance with embodiments of the present invention.

More specifically, flow diagram 100 depicts a method for selecting an actionable item displayed in a graphical user interface on a mobile computer system 10 with a touchscreen 26, in accordance with embodiments of the present invention. FIGS. 5A to 5J are diagrams of mobile computer system 10 depicting single-handed operation mode, which will be used to illustrate certain aspects of the present invention. FIG. 5A depicts operating system 15 as the foreground application. For convenience, home screen 40 includes twenty four icons, numbered 50.1 to 50.24, while dock 42 include four icons, numbered 50.25 to 50.28. Icon folders may also be displayed on home screen 40. Touchscreen 26 includes a bottom edge 27 and a side edges 29.

The method depicted in flow diagram 100 begins by detecting (110) a gesture, and, in response, activating (120) a single-handed operation (SHO) mode. In one embodiment, SHO mode may be effectuated using a simple add-on controller, TapRemote. In the -viewDidAppear message of a regular view controller, the inventive gesture handler can be initialized using a simple class method, such as, for example:

```
- (void) viewDidAppear: (BOOL) animated
{
    [ TapRemote tapRemoteForController: self ];
    [ super viewDidAppear:animated ]
}
```

The inventive functionality can be dismissed by sending a nil controller to TapRemote:

```
- (void) viewWillDisappear: (BOOL) animated
{
    [ TapRemote tapRemoteForController: nil ];
    [ super viewWillDisappear:animated ]
}
```

In another embodiment, SHO mode may be effectuated for Apple iOS using several Objective C protocols and interfaces for Cocoa touch frameworks:

```
@protocol TapRemoteControllerFeedback <NSObject>
@optional
- (NSArray*) filterTapRemoteTargetViews: (NSArray*) views;
@end
@interface TapRemote : NSObject<UIGestureRecognizerDelegate>
+ (void) tapRemoteForController: (UIViewController*) viewController;
@end
```

The gesture used to activate SHO mode should be unique with respect to the foreground application in order to prevent interference with gesture recognition by the foreground application, and, while SHO mode is active, the foreground application should be prevented from interpreting gestures made by the user.

In one embodiment, the gesture is a horizontal swipe on a lower portion of touchscreen 26, using thumb 5, that starts at a side edge of touchscreen 26 and proceeds towards the center of touchscreen 26. The height of the lower portion of touchscreen 26, on which this SHO mode activation gesture is made, depends upon the gesture recognition provided by the foreground application. For example, when operating system 15 is the foreground application, a horizontal swipe through home screen 40 is recognized and causes switching between home screens 40. A horizontal swipe though dock 42, however, is not recognized by operating system 15, so the height of the lower portion of touchscreen 26, on which the SHO mode activation gesture is made, can be set accordingly. In one embodiment, the lower portion has a predetermined height "h" above the bottom edge 27 of touchscreen 26 of about 15% of the height "H" of touchscreen 26.

Figure 5B:
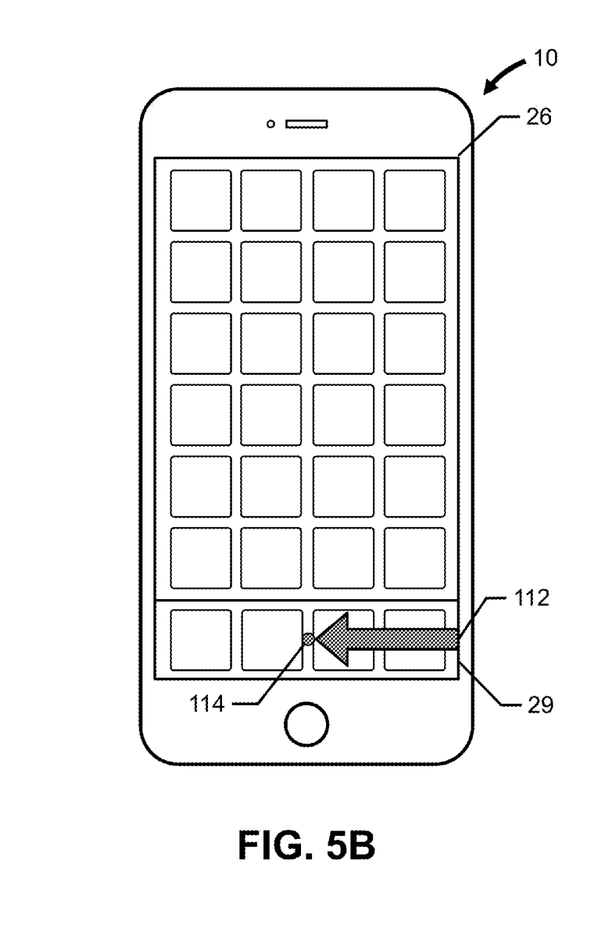

FIG. 5B depicts a horizontal swipe 112 that activates SHO mode when operating system 15 is the foreground application. The horizontal swipe 112 starts at the right side edge 29 of touchscreen 26 and ends at position 114, and may be performed by the user's right thumb 5. Alternatively, the swipe 112 could start at the left side edge 29, or the user could hold the mobile computer system 10 in the left hand and use the left thumb, swiping from either side edge.

The method continues by determining (130) a sequence of actionable items for the foreground application. In certain embodiments, the sequence of actionable items is determined by identifying all of the actionable items displayed by the foreground application on touchscreen 26, creating an initial list of actionable items, and then arranging the initial list of actionable items into an ordered list. In one embodiment, the actionable items are gathered from the graphical user interface, and then sent to a target view controller for filtering. Based on the state of the foreground application, actionable items may be removed or added to the initial list of actionable items, which advantageously provides the opportunity to add graphical user interface elements, such as as icons, images, etc., that are not otherwise gathered as actionable items from the graphical user interface.

In one embodiment, the predetermined order starts at the upper left corner of the graphical user interface and ends at the lower right corner of the graphical user interface. For example, when operating system 15 is the foreground application, the actionable items are the icons 50, which are identified and then arranged into an ordered sequence starting at icon 50.1 and ending at icon 50.28. In this example, all of the icons from the home screen 40 as well as the dock 42 are included in the sequence. Other ordered sequences are also contemplated by the present invention, such as, for example, starting in the upper right corner and ending at the lower left corner, starting at the left-most icon in the upper row and proceeding to the right-most icon of the that row, then dropping to the right-most icon of the next row and proceeding to the left-most icon of that row, and so on. The ordered sequence may also depend upon the orientation of the mobile computer device 10 within the user's hand, i.e., portrait or landscape.

Figure 5C:
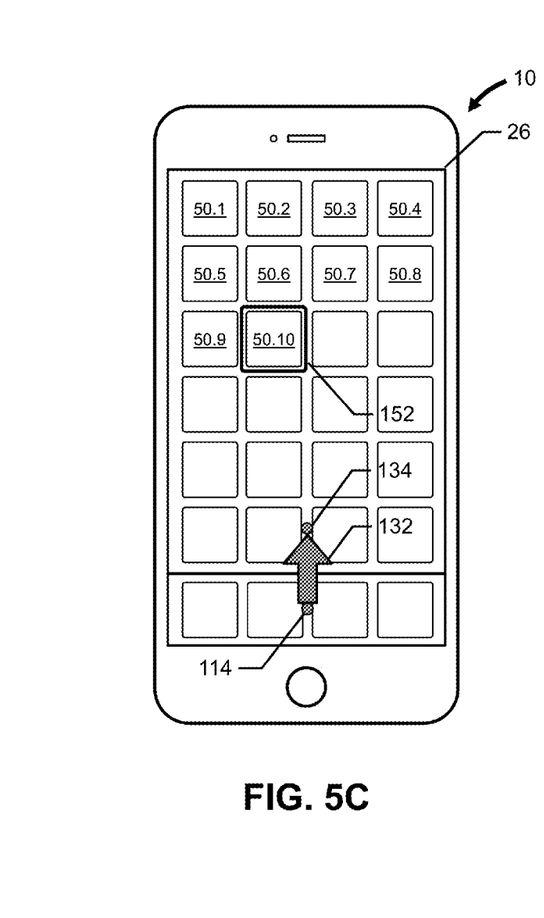

The method continues by detecting (140) another gesture on touchscreen 26, and, in response, highlighting (150) an actionable item based on the gesture. In one embodiment, the gesture is a vertical swipe 132 that begins at position 114 and ends at position 134, as depicted in FIG. 5C. The vertical swipe 132 may be performed using the same thumb 5 that executed the activation gesture, without lifting the thumb between the gestures. The vertical swipe 132 does not need to remain parallel to the side edges of the touchscreen and may describe an arc, since the vertical component of the gesture is used to determine position 134. In this example, position 134 corresponds to the tenth actionable item in the sequence, i.e., icon 50.10, which is highlighted with border 152. In other embodiments, the color of icon 50.10, such as, for example, the tint color, may be changed to indicate highlighting. In one embodiment, as the vertical swipe 132 moves from position 114 to position 134, the first nine icons in the sequence are successively highlighted and de-highlighted, until thumb 5 pauses at position 134, resulting in the highlighting of icon 50.10. In other words, icon 50.1 is highlighted first, de-highlighted, and then icon 50.2 is highlighted next, de-highlighted, and so on; only a single icon is highlighted at any one time.

The method continues by detecting (160) a further gesture on touchscreen 26.

Figure 5D:
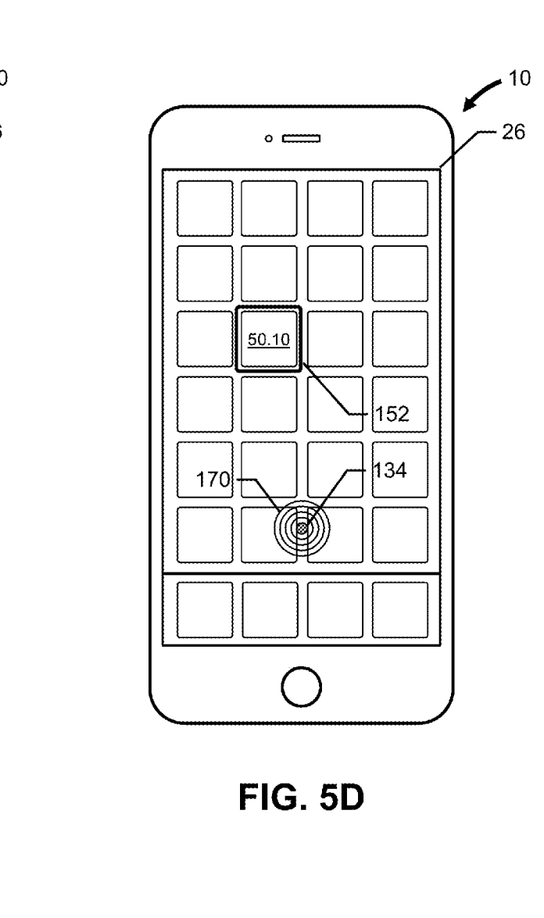

In response to detecting a release (170), the method continues by selecting (180) the highlighted actionable item for processing by the foreground application and de-activating (190) SHO mode. In this example, after thumb 5 is lifted off touchscreen 26 at position 134, as depicted in FIG. 5D, icon 50.10 is identified to operating system 15 and SHO mode is de-activated, allowing operating system 15 to resume gesture processing. Operating system 15 then launches the application associated with icon 50.10 for execution in the foreground. For other applications, if an a graphical user interface control element, an image, etc., is selected (180), a tap gesture, at the location of the element, image, etc., is provided to the foreground application.

Figure 5E:
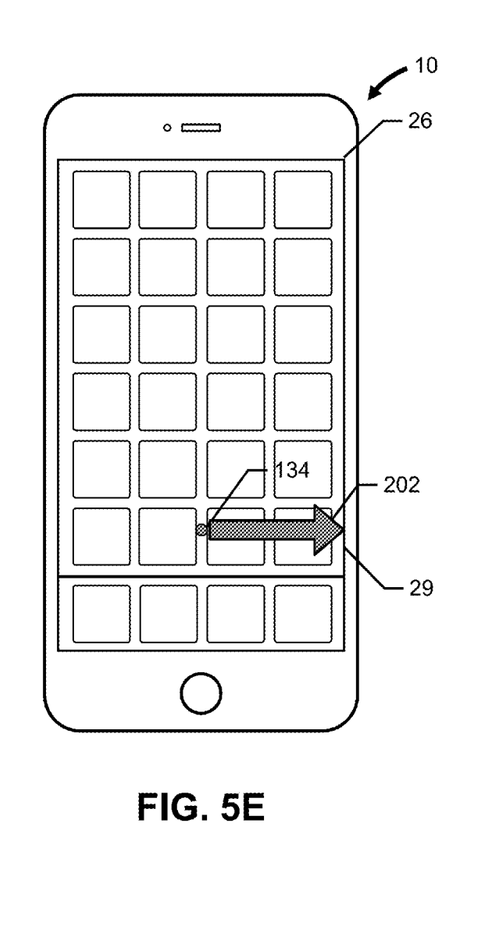

In response to a horizontal swipe (200), the method continues by de-activating (190) SHO mode. In one embodiment, horizontal swipe 202 begins at position 134 and ends at the side-edge 29 of touchscreen 26, as depicted in FIG. 5E.

Figure 5F:
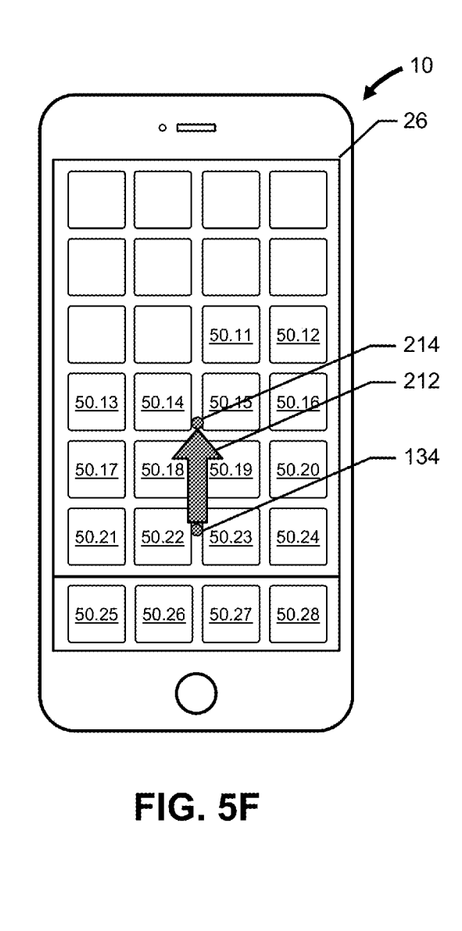

In response to a continuation of the vertical swipe (210), the method continues by determining whether the end of the sequence (220) has arrived. In one embodiment, a vertical swipe 212 begins at position 134 and ends at position 214, as depicted in FIG. 5F. The vertical swipe 212 may be performed using the same thumb 5 that executed the previous gesture, without lifting the thumb between the gestures. Vertical swipe 212 may pause before the last icon 50.28 is highlighted, allowing the user to select that icon using a release. However, if vertical swipe 212 continues until the last icon 50.28 in the sequence is highlighted, additional vertical movement of thumb 5 causes the last icon 50.28 to be de-highlighted, as depicted in FIG. 5F. In this example, all of the icons 50.1 to 50.28 have been successively highlighted and de-highlighted, and the end of the sequence has arrived.

Figure 5G:
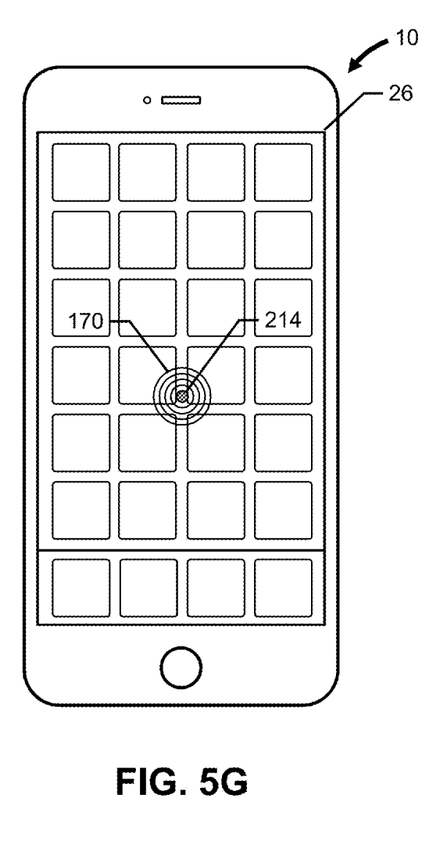
Figure 5H:
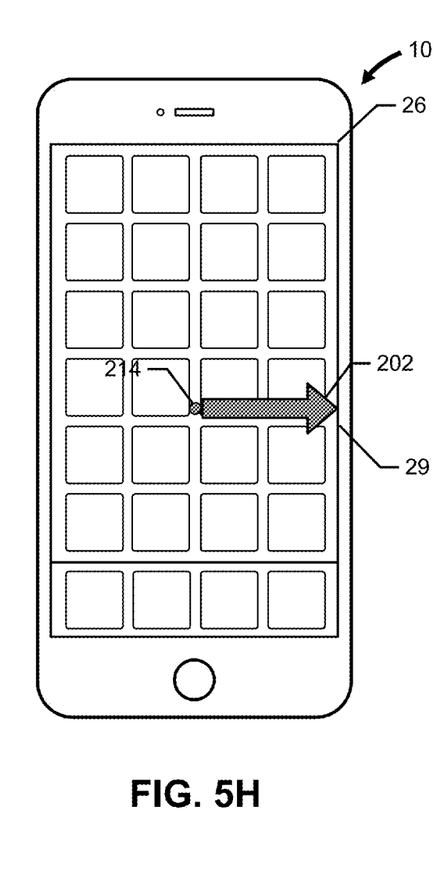

The method continues by detecting (230) a further gesture. In response to a release (240) or a horizontal swipe (250), SHO mode is de-activated (190) without selecting an icon for processing by operating system 15. As depicted in FIG. 5G, release 170 is detected at position 214, which causes SHO to be de-activated without selecting an icon for processing. Similarly, as depicted in FIG. 5H, horizontal swipe 202 is detected, starting from position 214 and continuing to side edge 29, which causes SHO to be de-activated without selecting an icon for processing.

Figure 5I:
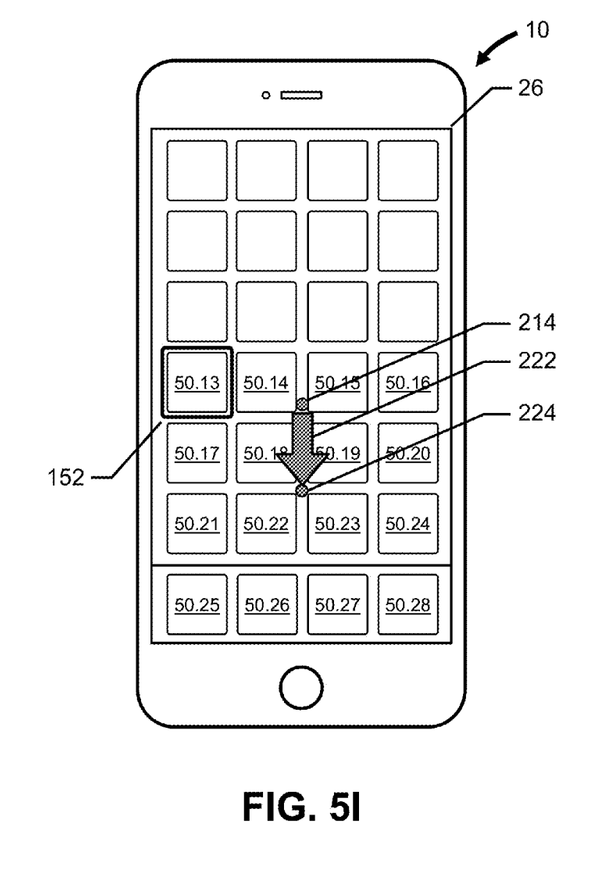
Figure 5J:
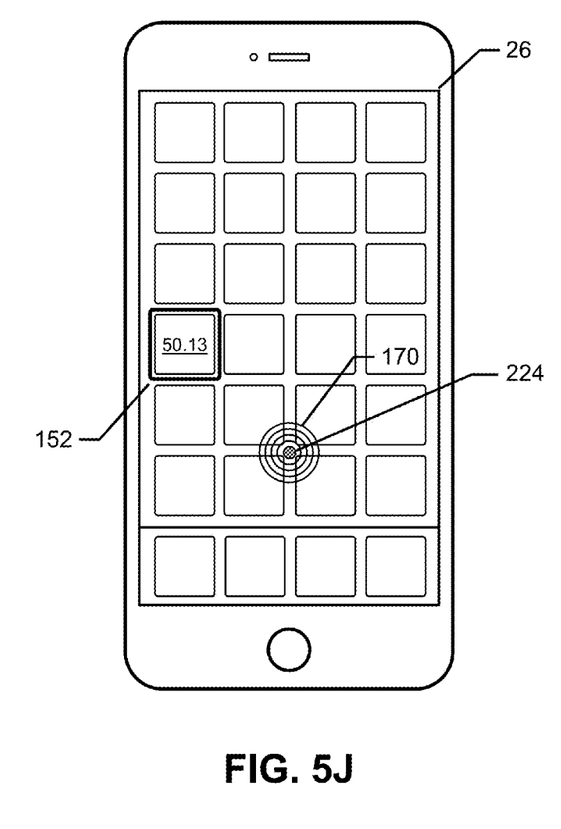

In response to a vertical swipe in a downward direction, the method continues by highlighting (150) an actionable item based on the vertical swipe. In one embodiment, vertical swipe 222 begins at position 214 and ends at position 224, as depicted in FIG. 5I. The vertical swipe 222 may be performed using the same thumb 5 that executed the other gestures, without lifting between gestures. In this example, position 224 corresponds to the thirteenth actionable item in the sequence, i.e., icon 50.13, which is highlighted with border 152. In response to detecting a release (170), the method continues by selecting (180) the highlighted actionable item for processing by the foreground application and de-activating (190) SHO mode. In this example, after thumb 5 is lifted off touchscreen 26 at position 224, as depicted in FIG. 5J, icon 50.13 is identified to operating system 15 and SHO mode is de-activated, allowing operating system 15 to resume gesture processing. Operating system 15 then launches the application associated with icon 50.13 for execution in the foreground.

If the beginning of the sequence is reached by the vertical swipe 222, then a release or a horizontal swipe would de-active SHO mode without selecting an icon for processing by operating system 15.

Embodiments of the present invention advantageously improve the operation of large screen mobile computer systems by allowing one-handed operation of certain aspects of the graphical user interface, using a combination of touchscreen gestures, without reducing the size of the graphical user interface, without removing a portion of the graphical user interface, etc. The present invention can be made and used, in a technological sense, in many mobile computer system industries, such as, for example, large screen smartphones, small tablet computers, etc.

In one embodiment, in response to detecting a first gesture on a touchscreen a sequence of actionable items for a foreground application executing on the mobile computer system is determined, in response to detecting a second gesture on the touchscreen one of the actionable items of the sequence is highlighted, and, in response to detecting a third gesture the highlighted actionable item is selected for processing by the foreground application and the single-handed operation mode is deactivated.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A non-transitory computer readable medium having instructions stored thereon that, when executed by a processor, cause the processor to select an actionable item displayed in a graphical user interface on a mobile computer system with a touchscreen, the selecting an actionable item comprising:
   detecting a first gesture starting from an edge of a lower portion of the touchscreen, the first gesture ending at a first position away from the edge, the lower portion having a predetermined height above a bottom edge of the touchscreen;
   in response to detecting the first gesture, activating a single-handed operation mode;
   determining a sequence of actionable items for a foreground application executing on the processor, including:
      gathering a plurality of actionable items displayed by the foreground application on the touchscreen,
      creating an ordered list of actionable items from at least the plurality of actionable items, and
      displaying the ordered list of actionable items on the touchscreen;
   detecting a second gesture on the touchscreen, the second gesture beginning at the first position and ending at a second position, the first and second gestures being performed sequentially without lifting;
   in response to detecting the second gesture,
      successively highlighting actionable items of the sequence as the second gesture moves between the first position and the second position, and
      highlighting one of the actionable items of the sequence based on the second position;
   detecting a third gesture on the touchscreen; and
   in response to detecting a release at the second position as the third gesture, selecting the highlighted actionable item for processing by the foreground application and de-activating the single-handed operation mode.

2. The non-transitory computer readable medium of claim 1, wherein the first gesture is a horizontal swipe starting at one of the side edges of the touchscreen.

3. The non-transitory computer readable medium of claim 2, wherein the second gesture is a vertical swipe or arc.

4. The non-transitory computer readable medium of claim 3, wherein selecting the actionable item further comprises:
   in response to detecting a horizontal swipe starting at the second position and ending at one of the side edges of the touchscreen as the third gesture, de-activating the single-handed operation mode.

5. The non-transitory computer readable medium of claim 3, wherein selecting the actionable item further comprises:
   in response to detecting the second gesture, de-highlighting the previous actionable item before highlighting the next actionable item.

6. The non-transitory computer readable medium of claim 5, wherein selecting the actionable item further comprises:
   in response to detecting a continuation of the second gesture from the second position to a third position as the third gesture, successively highlighting actionable items of the sequence as the third gesture moves between the second position and the third position, the previous actionable item being de-highlighted before the next actionable item is highlighted;
   determining that an end of the actionable item sequence has been reached; and
   in response to detecting a fourth gesture on the touchscreen, de-activating the single-handed operation mode, the fourth gesture being a release or a horizontal swipe starting at the third position and ending at one of the side edges of the touchscreen.

7. The non-transitory computer readable medium of claim 1, wherein the predetermined height is about 15% of the touchscreen height.

8. The non-transitory computer readable medium of claim 1, wherein the sequence maps actionable items in the graphical user interface beginning in the upper left corner of the graphical user interface and ending in the lower right corner of the graphical user interface.

9. The non-transitory computer readable medium of claim 1, wherein the actionable items are a plurality of icons arranged in a grid pattern, and highlighting the actionable item includes changing a color of the icon.

10. The non-transitory computer readable medium of claim 1, wherein the actionable items are a plurality of graphical control elements, and highlighting the actionable item includes adding a border around the graphical control element.

11. A computer-based method for selecting an actionable item displayed in a graphical user interface on a mobile computer system with a processor and a touchscreen, the method comprising:
   detecting a first gesture starting from an edge of a lower portion of the touchscreen, the first gesture ending at a first position away from the edge, the lower portion having a predetermined height above a bottom edge of the touchscreen;
   in response to detecting the first gesture, activating a single-handed operation mode;
   determining a sequence of actionable items for a foreground application executing on the processor, including:
      gathering a plurality of actionable items displayed by the foreground application on the touchscreen,
      creating an ordered list of actionable items from at least the plurality of actionable items, and
      displaying the ordered list of actionable items on the touchscreen;
   detecting a second gesture on the touchscreen, the second gesture beginning at the first position and ending at a second position, the first and second gestures being performed sequentially without lifting;
   in response to detecting the second gesture,
      successively highlighting actionable items of the sequence as the second gesture moves between the first position and the second position, and
      highlighting one of the actionable items of the sequence based on the second position;
   detecting a third gesture on the touchscreen; and in response to detecting a release at the second position as the third gesture, selecting the highlighted actionable item for processing by the foreground application and de-activating the single-handed operation mode.

12. The method of claim 11, wherein the first gesture is a horizontal swipe starting at one of the side edges of the touchscreen, and the second gesture is a vertical swipe or arc.

13. The method of claim 12, further comprising:
in response to detecting the second gesture, de-highlighting the previous actionable item before highlighting the next actionable item;
in response to detecting a continuation of the second gesture from the second position to a third position as the third gesture, successively highlighting actionable items of the sequence as the third gesture moves between the second position and the third position, the previous actionable item being de-highlighted before the next actionable item is highlighted;
determining that an end of the actionable item sequence has been reached; and
in response to detecting a fourth gesture on the touchscreen, de-activating the single-handed operation mode, the fourth gesture being a release or a horizontal swipe starting at the third position and ending at one of the side edges of the touchscreen.

14. The method of claim 11, wherein the predetermined height is about 15% of the touchscreen height, and the sequence maps actionable items in the graphical user interface beginning in the upper left corner of the graphical user interface and ending in the lower right corner of the graphical user interface.

15. The method of claim 11, wherein the actionable items are a plurality of icons arranged in a grid pattern, and highlighting the actionable item includes changing a color of the icon, or the actionable items are a plurality of graphical control elements, and highlighting the actionable item includes adding a border around the graphical control element.

16. A mobile computer system, comprising:
a touchscreen;
a memory; and
a processor, coupled to the touchscreen and the memory, configured to select an actionable item displayed in a graphical user interface on a mobile computer system with a processor and a touchscreen, the selecting comprising:
detecting a first gesture starting from an edge of a lower portion of the touchscreen, the first gesture ending at a first position away from the edge, the lower portion having a predetermined height above a bottom edge of the touchscreen;
in response to detecting the first gesture, activating a single-handed operation mode;
determining a sequence of actionable items for a foreground application executing on the processor, including:
gathering a plurality of actionable items displayed by the foreground application on the touchscreen,
creating an ordered list of actionable items from at least the plurality of actionable items, and
displaying the ordered list of actionable items on the touchscreen;
detecting a second gesture on the touchscreen, the second gesture beginning at the first position and ending at a second position, the first and second gestures being performed sequentially without lifting;
in response to detecting the second gesture,
successively highlighting actionable items of the sequence as the second gesture moves between the first position and the second position, and
highlighting one of the actionable items of the sequence based on the second position;
detecting a third gesture on the touchscreen; and
in response to detecting a release at the second position as the third gesture, selecting the highlighted actionable item for processing by the foreground application and de-activating the single-handed operation mode.

17. The system of claim 16, wherein the first gesture is a horizontal swipe starting at one of the side edges of the touchscreen, and the second gesture is a vertical swipe or arc.

18. The system of claim 17, wherein the processor is further configured to:
in response to detecting the second gesture, de-highlighting the previous actionable item before highlighting the next actionable item;
in response to detecting a continuation of the second gesture from the second position to a third position as the third gesture, successively highlight actionable items of the sequence as the third gesture moves between the second position and the third position, the previous actionable item being de-highlighted before the next actionable item is highlighted;
determine that an end of the actionable item sequence has been reached; and
in response to detecting a fourth gesture on the touchscreen, de-activate the single-handed operation mode, the fourth gesture being a release or a horizontal swipe starting at the third position and ending at one of the side edges of the touchscreen.

19. The system of claim 16, wherein the predetermined height is about 15% of the touchscreen height, and the sequence maps actionable items in the graphical user interface beginning in the upper left corner of the graphical user interface and ending in the lower right corner of the graphical user interface.

20. The system of claim 16, wherein the actionable items are a plurality of icons arranged in a grid pattern, and highlighting the actionable item includes changing a color of the icon, or the actionable items are a plurality of graphical control elements, and highlighting the actionable item includes adding a border around the graphical control element.

* * * * *

UNITED STATES PATENT AND TRADEMARK OFFICE
CERTIFICATE OF CORRECTION

| | |
|---|---|
| PATENT NO. | : 9,690,463 B2 |
| APPLICATION NO. | : 14/617772 |
| DATED | : June 27, 2017 |
| INVENTOR(S) | : Lavoie |

It is certified that error appears in the above-identified patent and that said Letters Patent is hereby corrected as shown below:

In the Specification

In Column 1, Line 11, delete "entirety" and insert -- entirety. --, therefor.

In Column 7, Lines 9-10, delete "as as" and insert -- as --, therefor.

In Column 7, Line 64, delete "an a" and insert -- a --, therefor.

Signed and Sealed this
Twenty-sixth Day of June, 2018

Andrei Iancu
*Director of the United States Patent and Trademark Office*